Patented Dec. 9, 1941

2,265,389

UNITED STATES PATENT OFFICE 2,265,389

CATALYTIC CRACKING PROCESS

Ralph M. Melaven, Highland, Ind., and Rodney V. Shankland, Chicago, Ill., assignors to Standard Oil Company, Chicago, Ill., a corporation of Indiana No Drawing. Application February 7, 1939, Serial No. 255,098

3 Claims. (Cl. 196—52)

This invention relates to the conversion of hydrocarbon oils in the presence of catalysts and particularly to the conversion of heavy hydrocarbon oils, such as gas oil, petroleum residuums, hydrocarbon waxes, etc. into lower boiling hydrocarbons, particularly gasoline. The invention relates more particularly to the preparation of new catalysts for the conversion of heavy hydrocarbon oils at high temperatures. One of the objects of the invention is to provide a catalyst which will convert a larger amount of the oil into gasoline before it becomes necessary to regenerate it. Another object of the invention is to provide a catalyst which may be repeatedly regenerated by treatment with an oxygen containing gas for removal of carbonaceous matter without significant loss of catalyst activity. Still another object of the invention is to provide a catalyst of great physical strength which may be employed in granular form without serious disintegration. Other objects will become apparent from the following description.

The catalyst which we employ is prepared in the following manner: A silica gel, so-called, is prepared by adding a solution of soluble silicate, for example, sodium silicate, to an excess of strong mineral acid, such as hydrochloric acid or sulfuric acid. We prefer to use sodium silicate solution containing about 15% to 20% of $Na_2(SiO_3)_x$. In this formula $x$ is unity or greater. The acid employed in making the gel may suitably be about 15% to 25% $H_2SO_4$ and an excess of 10% to 50% may suitably be employed. Other strong acids may be used, such as HCl, $HNO_3$, etc. We have sometimes reversed this procedure, however, and added the acid to the silicate solution which causes immediate precipitation. This method gives a very active catalyst but one of low mechanical strength, requiring pelleting if used in fixed bed apparatus.

After adding the silicate solution to the acid, and mixing, it is allowed to stand and soon the solution solidifies to a jelly. This is broken up by agitation and washed in running water until substantially all the acid and soluble salts are removed. Considerable time is required to permit all the salts to diffuse from the pieces of jelly and the washing operation is facilitated by employing hot water or by digestion and boiling. The gel is then separated from the water and dried at ordinary or slightly elevated temperatures. It now resembles an irregular sand and at this stage it is crushed and screened to remove particles which are too fine for ultimate use. The gel so prepared is characterized by possessing a submicroscopic pore structure which provides an enormous amount of "pore surface" accessible only to those materials which can freely penetrate the pores and gain access to the interior of the grains. If desired, the gel may be washed only partially at first, then partly dried and finally washed until the water gives no further test for acid ion. Also, the gel may be further washed with distilled water after final drying.

The next step in the preparation of our improved catalyst is to subject the gel to the action of a soluble salt of manganese under conditions such that a layer of insoluble manganese compound is deposited on the interior pore surface of the gel. Heretofore, attempts have been made to deposit manganese compounds on silica gel but these attempts have usually not succeeded in accomplishing more than depositing the manganese compound on the external surface of the silica gel grains. Because of the extremely small dimensions of the pores, which are of the order of 5 millimicrons in diameter, these are apparently plugged by precipitates and great care must be exercised to prevent the formation of a heavy precipitate. This we avoid by maintaining the gel in a slightly acid condition and the presence of basic precipitating reagents is scrupulously avoided.

Instead of preparing a silica gel, we may also employ precipitated silica which may be prepared according to the following procedure. Commercial water glass is diluted with an equal volume of distilled water and to this solution is added, with stirring, hydrochloric acid of 5 N concentration until there is present about 20% of acid in excess of that required to neutralize the water glass. Sulfuric acid or other acid may also be used. The precipitated silica is then washed with hot distilled water until the washings test free of chloride. About 100 grams of the moist precipitate is digested for two hours with about 3 liters of 0.1 molar manganese sulfate solution on a steam bath. This treatment causes a hydrolysis of the manganese sulfate accompanied by a deposition of a manganese compound on the surface of the silica which we believe to be an adsorbed layer of active manganese-silica compound.

The treated silica was washed three times by decantation with distilled water followed by two washings of hot water and two washings of cold water on a suction funnel using about 300 ml. of water for each washing. The washed material was finally pelleted and dried at 210 to 220° F. in a steam heated drying oven, after which it was ready for use as a catalyst for promoting cracking of gas oil. It is estimated that the amount of manganese in the dried catalyst was about 0.5 wt. per cent.

When activating the gel with manganese salt, we prefer to maintain the solution slightly acid corresponding to a hydrogen ion concentration of about 2 to 6 pH. The hydrogen ion concentration will usually increase during the activation treatment. For example, in one case a manganese sulfate solution of 0.1 molar concentration was adjusted to a pH of 3.48. After heating to 190° F., it was still 3.48 pH but after treating with silica gel for one-half hour the pH dropped to 3.11 and after two hours heating with the silica, it remained constant at 3.18.

We prefer to employ this catalyst for the cracking of hydrocarbon oils at temperatures of about 700 to 1050° F., employing contact times of between about ½ second to 5 minutes, preferably contact times within the range of 1 second to 1 minute. Contact time referred to is the time required for one volume of oil vapor at the condition of experiment to pass one volume of catalyst. We prefer to employ our new catalyst at relatively low pressures, for example, atmospheric to 50 lbs. per square inch gage. However, somewhat higher pressures, e. g., 100 to 200 lbs. per square inch may be used.

As an example of the use of our manganese-silica catalyst for the cracking of heavy petroleum oils to gasoline, the following data show the results obtained on the cracking of midcontinent gas oil of 35.6° A. P. I. gravity:

| | |
|---|---|
| Cracking temperature | 927° F. |
| Pressure | Atmospheric |
| Volume of feed/volume of catalyst space/hour | 1.23 |
| Bbls. of oil charged/ton of catalyst/hour | 21.8 |
| Time of contact | 8.2 seconds |
| Length of run | 6.03 hours |
| Weight recovery | 99.2% of oil charged |
| Once through yields: | |
|    Dry gas | 2.2 weight per cent |
|    Gasoline | 14.1 volume per cent |
|    Recycle stock | 82.6 volume per cent |
| Pounds of gas/gal. of gasoline | 1.10 (18.4 cubic feet) |
| Specific gravity of gas | .78 |
| Gasoline characteristics: | |
|    End point | 400° F. |
|    Gravity | 54.6 A. P. I. |
|    Knock rating (from blends) | 83.5 C. F. R.-M. |
|    Unsaturation | 67.0% |
| Recycle oil: | |
|    End point | 698° F. |
|    Gravity | 35.4 A. P. I. |
|    Unsaturation | 18.9% |

The foregoing data show that the manganese-silica gel catalyst produces a good yield of gasoline with a high knock rating. The once through yield under these conditions was 14.1% and the knock rating 83.5 C. F. R. motor method. Unactivated silica gel in comparison gave a yield of 9.5% and a knock rating of only 72.6 C. F. R. motor method under the same conditions. The remarkable improvement in the knock rating of the gasoline, therefore, must be attributable to the activation of the silica by the manganese.

The enhanced effectiveness of our new catalyst is not easily explained. We believe, however, that when the silica gel is treated with the manganese salt solution, there occurs a simultaneous adsorption and hydrolysis causing the deposition of a manganese compound on the surface of the silica throughout its entire pore structure. This compound is probably an oxygen compound of manganese such as manganese hydroxide, or more probably, the manganese unites to form a complex compound with the $SiO_2$ molecules and hydrated $SiO_2$ molecules on the surface of the gel and within the pores of the grains thereof. It is believed that the molecules of $SiO_2$ at the surface present unsatisfied valences which form a chemical union with the manganese and its compounds so that the gel treated with manganese salt solution is substantially identical in physical structure with the untreated silica gel excepting that the entire surface, including the immense interior pore surface, is coated with not more than a monomolecular layer of manganese compound. Furthermore, we believe that the electronic structure of the manganese compound on the surface is disturbed by the unbalanced electronic structure of the $SiO_2$, previously referred to as unsatisfied valence, and that in some way the peculiarly high activity of these catalysts is related to their unbalanced electronic structure, or to the molecular orientation of the manganese compound.

As evidence of the hydrolysis of the manganese salt on the surface of the gel, we find that the solution develops a definite acidity which can only be accounted for by the following hydrolytic reaction:

$$Mn(NO_3)_2 + 2H_2O + xSiO_2 = Mn(OH)_2 \cdot (SiO_2)_x + 2HNO_3$$

We choose to call this reaction an "adsorbolytic" reaction, indicating that the hydrolysis or splitting of the manganese salt is brought about by the adsorption phenomenon. Simultaneously, with the formation of acid in the solution, there is deposited within the silica a measurable amount of manganese compound which we have shown by analysis to vary between about 0.1% to 2% of manganese, depending partly on the concentration of manganese salt solution employed, the hydrogen ion concentration in the solution, and the method of treatment.

Although we prefer to use a manganese salt solution of about 0.1 molar concentration, this may be varied over a considerable range without greatly affecting the amount of manganese deposited within the gel. Thus, we may use concentrations from about 0.02 M to 1.5 M, if desired. We may increase the amount of manganese hydrolyzed by various methods. We may also repeat the treatment of the gel with manganese solution of the same or different concentrations, or we may perform the treatment stagewise in a flowing stream. The manganese salt solution may be made to flow through a series of beds of the gel in rotation so that the most nearly spent solution serves to contact the fresh gel, thus adsorbing the greater amount of the manganese from the solution. The acidity may be adjusted between stages, for example, by adding a base to the solution, sufficient to neutralize the acid liberated by the adsorbolytic action previously mentioned.

In the previous description of our method of preparing our new catalyst, the freshly prepared silica was dried after washing and before treating with the manganese solution. However, it is sometimes desirable to omit this drying step.

The freshly made silica which has been thoroughly washed may be immediately treated with the manganese solution and then dried. In this case, however, a longer time is required for diffusion of the solution into the larger pieces of the silica.

Freshly precipitated silica was added to a 0.1 M solution of manganese sulfate and heated for about 2 hours at 200° F. to permit complete penetration and activation of the silica. The silica was then separated and washed with water until free of sulfuric acid. After drying, the catalyst was ready for use. In place of using the sulfate, we may use other soluble salts of manganese, for example, the chloride and nitrate.

As indicated above, the catalyst may be regenerated after it has become fouled with carbonaceous deposits in the cracking operation. Regeneration is most conveniently accomplished by passing a stream of air and inert gas, for example, steam, through the catalyst bed, care being taken to control the oxygen concentration of the regenerating gas so that the combustion temperature is kept below about 1200° F. and preferably below about 1100° F. Excessive heating above these temperatures causes catalyst deterioration.

After regeneration, the cracking may be continued. The duration of cracking between regeneration periods may be about 5 hours but this depends largely on the nature of the stock being cracked. If the stock cracked is a residual oil containing asphaltic matter, the duration of cracking is considerably less before catalyst activity is seriously reduced. Thus, with a typical midcontinent residual oil of about 22° A. P. I. gravity, the catalyst may be used for a period of about 30 minutes to 2 hours between regenerations. When using gas oil, we have found that in a typical operation the catalyst activity has decreased about 25% to 50% in a period of 6 hours. In the case of residual oils or very heavy distillate charging stocks, we may initially crack the oil in one catalyst bed and produce intermediate boiling hydrocarbons with very little gasoline. Then we may pass the vapors directly into a second catalyst bed with or without heating to a higher temperature to complete the cracking. The extent or depth of cracking per pass depends chiefly on the freshness of the catalyst, the time of contact, and on the temperature. If desired, the process may be conducted to produce from gas oil about 40% to 55% of gasoline in a single pass and the uncracked products heavier than gasoline may be separated by fractionation and either recycled in the operation or cracked in a secondary cracking operation. Alternatively, the extent of cracking may be maintained about 20% to 30% and the uncracked heavy products may be recycled until completely cracked, the only products being gasoline and gas. A conversion rate of about 30% to 40% per pass is preferred. Carbonaceous matter produced in the operation is deposited on the catalyst and removed in regeneration.

If desired, we may employ our catalyst in moving bed apparatus in which a portion of the spent catalyst is continuously withdrawn and regenerated externally, fresh and/or regenerated catalyst being supplied continuously to the apparatus. We may also employ our catalyst in finely divided form. For example, the catalyst may be finely divided by grinding and supplied as a slurry in oil to the cracking chamber or coil or introduced as a powder into the vapor stream. In this type of operation, the spent catalyst is settled or filtered from the products and separately regenerated.

We have given certain examples of methods of preparing and using our new catalyst. It is clear that other examples might be given and we do not intend that our invention be specifically restricted to those examples given. Thus, when activating silica with a manganese sulfate solution of 0.1 molar concentration, in one case the hydrogen ion concentration was initially adjusted to 3.18 pH. After heating the solution to 190° F., before contacting with the silica, the pH remained unchanged but on contacting with the silica the pH decreased to 2.97 after an hour and remained there throughout the two-hour period of treatment.

We intend that our invention be limited only by the following claims.

We claim:

1. The process of converting heavy hydrocarbon oil into high knock rating gasoline which comprises vaporizing said oil, subjecting the vapors at a temperature between about 700 and 1050° F. to the action of a solid catalyst consisting essentially of active silica treated with an acid solution of manganese compound and thereafter washed free of soluble salts and dried, withdrawing hydrocarbon vapors from said catalyst and subjecting them to fractionation to separate the gasoline from unconverted hydrocarbons.

2. The process of claim 1 wherein the cracking operation is interrupted periodically and the catalyst is regenerated in situ by treatment with an oxidizing gas.

3. The process of converting heavy hydrocarbon oil to high knock rating gasoline which comprises vaporizing said oil and contacting the vapors at a conversion temperature with a catalyst consisting essentially of silica gel promoted with about 0.1% to 2% of manganese, said catalyst having been prepared by treating silica gel with an acid solution of a soluble manganese salt followed by washing and drying the resulting product.

RALPH M. MELAVEN.
RODNEY V. SHANKLAND.